July 26, 1966     J. R. COLE ETAL     3,263,091
TRANSISTORIZED SYNCHRONIZED INVERTER
Original Filed Sept. 14, 1960
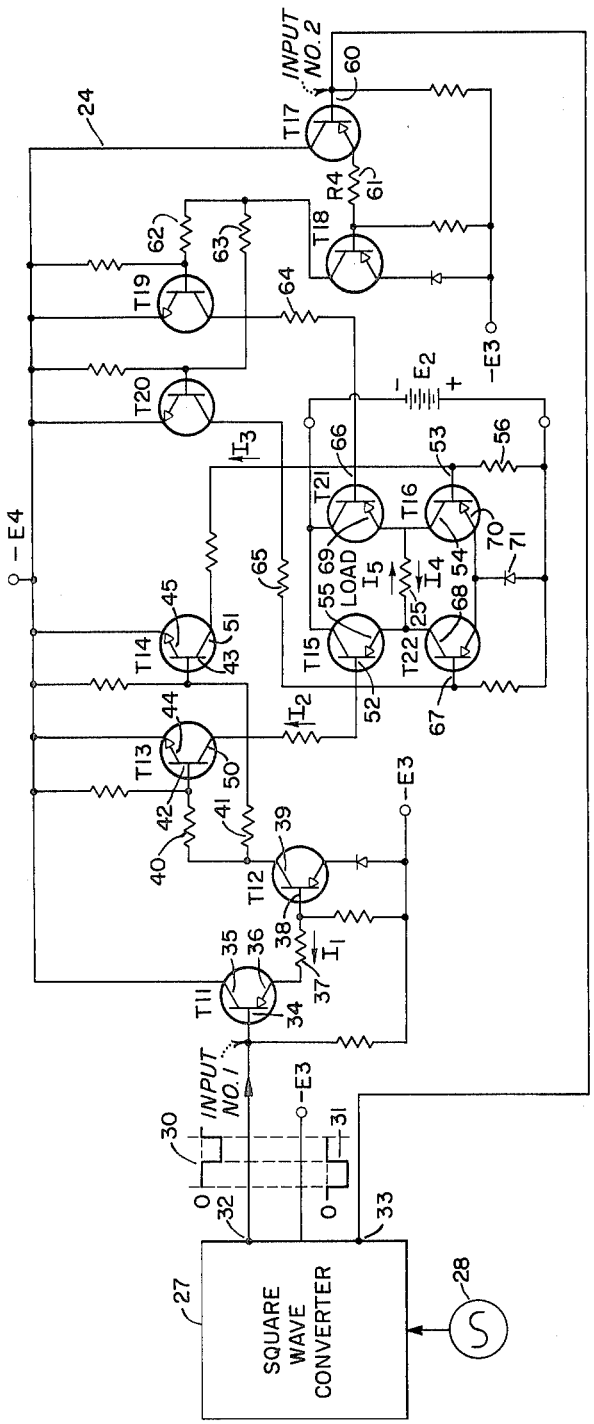
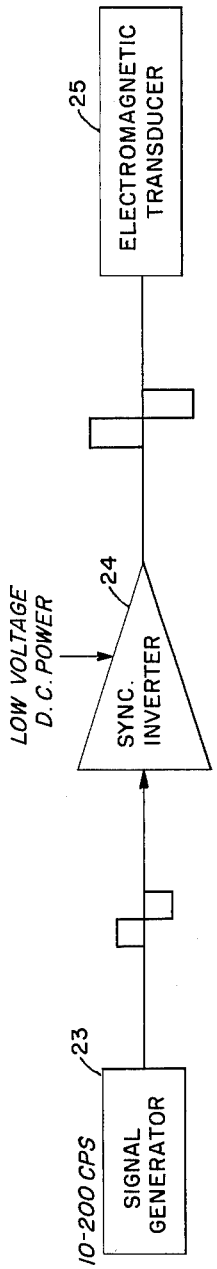
INVENTORS
JIMMY R. COLE
BY    DOUGLAS S. SULLIVAN
ATTORNEY United States Patent Office 3,263,091
Patented July 26, 1966

3,263,091
TRANSISTORIZED SYNCHRONIZED INVERTER
Jimmy R. Cole and Douglas S. Sullivan, Ponca City, Okla., assignors to Continental Oil Company, Ponca City, Okla., a corporation of Delaware
Continuation of application Ser. No. 55,983, Sept. 14, 1960. This application Sept. 10, 1963, Ser. No. 307,955
1 Claim. (Cl. 307—88.5)

This is a continuation of applicants' copending application Serial No. 55,983 filed September 14, 1960, entitled, "Transistorized Synchronized Inverter," now abandoned.

This invention relates generally to a synchronized power amplifier and in particular to a transistorized synchronized inverter used as a driving means for an electromagnetic transducer.

This invention is related specifically to a method for driving electromagnetic transducers which are particularly adapted for the generation of signals in seismic exploration. However, the invention is not so limited to the particular use but may be adapted to any application where a high power square wave is needed.

The U.S. Patent 2,688,124 issued to William E. N. Doty et al. discloses a method of seismic surveying which is performed by generating a nonrepetitive signal of known frequency content and magnitude at a fixed location on the surface of the earth and recording the received signal at a location remote from the transmitted signal. In order to practice this invention, it has been found that electromagnetic transducers form an ideal method for generating the variable frequency nonrepetitive signal; however, these electromagnetic transducers must necessarily be large if sufficient energy is to be received from deep subterranean strata. The problem of driving the electromagnetic transducers poses a formidable problem when it is realized that the equipment must be readily portable, rugged, and reliable. The obvious method for driving a plurality of electromagnetic transducers with a synchronized nonrepetitive signal of known frequency content and magnitude, is to generate said signal from a single source, amplify the signal through a power amplifier or amplifiers, and apply the amplified signal to the magnetic transducers. Unfortunately, the size of the synchronized power amplifiers becomes prohibitive when more than a few electromagnetic transducers are operated simultaneously. Prior transistorized bridge circuits have been developed which adapt themselves readily to the requirements of portability, ruggedness, and light weight power amplifier construction. Two general forms of transistorized bridges are known. The first type consists of transistors which are of a similar type, that is, all are either N–P–N or P–N–P. The second form of bridge has a combination of P–N–P and N–P–N transistors. While the combination form of bridge is simple to construct and drive requiring two signals 180° out of phase with each other, the bridge has relatively low power output since high power N–P–N transistors are not economically available. Since the N–P–N power transistor is economically unavailable, the bridge comprising four P–N–P transistors remains the only feasible high powered compact bridge. However, no method has been conveniently devised for satisfactorily operating a P–N–P bridge with a sine wave input such that the P–N–P bridge is used to its maximum capabilities.

This invention then specifically relates to a method for driving a P-N-P transistorized bridge such that it may be readily used to drive high powered electromagnetic transducers.

Therefore, it is an object of this invention to provide a method for operating a high power utilization source by a small, compact power generation means.

It is a further object of this invention to provide a transistorized inverter that is cheap and inexpensive to build.

It is a still further object of this invention to provide a method for driving a P–N–P type transistorized bridge with extremely high efficiency thereby reducing the transistor power to output wattage ratio.

Other objects, features, and advantages of the invention will become apparent from the following description and claim when read in view of the accompanying drawings, in which:

FIG. 1 is a blocked diagram of a system incorporating the transistorized synchronized inverter; and FIG. 2 is a schematic of the transistorized synchronized inverter.

Referring to FIGS. 1 and 2, the transistorized inverter obtains its high efficiency by generating a square wave from the driving source such as signal generator 23 which is applied to the input of sync inverter 24. The output of the sync inverter is apppplied to the electromagnetic transducer or other load 25. The signal generator 23 comprises a square wave converter 27 and a driving source such as an alternating current generator 28. Alternating current generator 28 may be any well known form of generator such as an audio signal generator or recorded signal on a magnetic tape with sufficient amplification to operate square wave converter 27. Square wave converter 27 develops output square waves 30 and 31 which are synchronized with the positive and negative portions of the alternating signal from generator 28. Thus, for example, signal 30 would be synchronized with the negative portion of the sine wave and signal 31 would be synchronized with the positive portion of sine wave from generator 28. However, it is to be noted that both signal 30 and signal 31 are negative and further that neither signal is on during any period of the on signal of the other signal. Square wave converter 27 is more fully described in co-pending United States application Serial No. 46,268 filed July 29, 1960 entitled "Sine Wave-Square Wave Converter," the applicants are Jimmy R. Cole, Roy E. Garten, Jr., and Joe W. Walton. Square wave converter 27 has outputs 32 and 33 applied to inputs 1 and 2, respectively, of sync inverter 24. Input 1 is applied to the base 34 of transistor T–11. Collector 35 is connected to a source of voltage and emitter 36 is connected through a resistor 37 to base 38 of transistor T–12. Collector 39 of transistor T–12 is connected through resistors 40 and 41 to the bases 42 and 43 of transistors T–13 and T–14, respectively. Emitters 44 and 45 of transistors T–13 and T–14 are connected to a source of voltage. Collectors 50 and 51 of transistors T–13 and T–14 are connected, respectively, to the bases 52 and 53 of transistors T–15 and T–16. The collector 54 and emitter 55 of transistors T–15 and T–16, respectively, are connected to the opposite ends of load 25. A resistor 56 is connected between the base 53 and a source of voltage $+E_1$. The second output 33 from square wave converter 27 is applied to the base 60 of transistor T–17. Like the previously described circuit the output of transistor T–17 is connected through resistor 61 to transistor T–18. The output of transistor T–18 is connected through resistors 62 and 63 to the input of transistors T–19 and T–20, respectively. The outputs of transistors T–19 and T–20 are connected through resistors 64 and 65 to the bases 66 and 67 of transistors T–21 and T–22, respectively. The output from collector 68 of transistor T–22 and from emitter 69 of transistor T–21 are connected to opposite ends of load 25 such that transistors T–15, T–16, T–21, and T–22 form a bridge.

Operation

Generator 28 develops a signal which may constant or may vary through a period of time in frequency, for example, from 10 to 200 cycles per second. The output from generator 28, however, is a sine wave. The sine wave as applied to the transistorized bridge would cause a slow transition from cutoff to saturation. This slow transition from cutoff to saturation. This slow transition would result in an extreme amount of heat generated by the internal resistance of the transistor as it swings from a maximum impedance at cutoff to minimum impedance at saturation. For this type of use the transistor must obviously be large enough to furnish not only the required external power but be able to withstand the extreme amount of heat developed for its internal resistance. However, if a square wave having sufficient magnitude is applied to the same transistor to switch it from cutoff to saturation, the heat generated by the internal resistance of the transistor becomes substantially negligible. The more rapidly the transistor is switched from cutoff to saturation, the lower is the heat generated within the transistor during the transitional period from cutoff to saturation. Thus, a square wave inverter converts the signal from sine wave generator 28 to a square wave that has its output in time synchronism with the input signal from generator 28. The P–N–P bridge comprising transistors T–15, T–16, T–21, and T–22 can be made quite cheaply since high power P–N–P transistors are readily available. However, the P–N–P bridge is complicated by the fact that either T–15, T–16, or T–21, T–22 must be completely cutoff while the remaining pair of transistors is driven to saturation. This form of drive is therefore more complex than the N–P–N, P–N–P type synchronized bridge in which both transistors may be continuously operated but under a pushpull type operation. A form of signal, such as 30 and 31 is required to operate the P–N–P type bridge. When signal 30 is applied to base 38 of transistor T–11, T–11 is driven from cutoff to saturation causing a current $I_1$ to flow through resistor 37. The signal 30 will also cause the bias at base 38 of transistor T–12 to be reduced, driving transistor T–12 from cutoff to saturation. The impedance of transistor T–12 between its collector and emitter will drop to a very low value causing an increase of voltage from bases to emitters of transistors T–13 and T–14, respectively. Conduction of transistors T–13 and T–14 results in a current $I_2$ and $I_3$ through the reduced impedance of transistors T–13 and T–14, respectively. Currents $I_2$ and $I_3$ will cause the base to emitter voltage of transistors T–15 and T–16 to go negative (1 to 2 volts) causing them to conduct. The conduction of T–16 and T–15 will cause a current $I_4$ to flow through diode 71, transistor T–16, load 25, transistor T–15 to the source of power $-E_2$. Diode 71 serves to reverse bias the bridge transistors, T–15, T–16, T–21, and T–22 in order to reduce the leakage or cutoff currents through said bridge transistors to a very low value.

During the negative going portion of signal 30, signal 31 was at zero volts causing transistors T–17 to remain nonconductive, thereby also causing transistors T–18, T–19, and T–20 to remain in a nonconductive state. Consequently, T–21 and T–22 will remain nonconductive. When the negative portion of signal 31 is applied through input 2 to the base 60 of transistor T–17, transistors T–17, T–18, T–19, and T–20 are rendered conductive. Conversely, since signal 30 during this period is zero, transistors T–11, T–12, T–13, and T–14 remain nonconductive. The conduction of T–19 and T–20 result in the conduction of T–21 and T–22, respectively. When T–21 and T–22 conduct, a current $I_5$ flows from power source $E_2$ through diode 71, transistor T–22, load 25, transistor T–21, to power source $E_2$. It is to be noted that $I_5$ is opposite in direction to $I_4$, thus an alternating square wave signal is applied to load 25 which is in precise time synchronism with the original generator sine wave signal 28.

Thus, a circuit has been described which provides for the maximum efficiency of a transistorized bridge. The circuit further provides for the use of high powered P–N–P type transistors by disclosing a novel method of driving said transistors without resorting to a P–N–P, N–P–N type bridge. While the synchronized inverter has been disclosed for specific use with an electromagnetic transducer used in seismic exploration, it is obvious that any form of load may be substituted for the electromagnetic transducer and still be within the spirit and scope of this invention.

Although this invention has been described with respect to particular embodiments thereof, it is not to be so limited, as changes and modifications may be made therein which are within the spirit and scope of the invention as defined by the appended claim.

We claim:

A drive system for a low frequency, high powered electromagnetic seismic wave transducer having two input terminals, comprising:

a P–N–P transistor bridge having two output terminals connected to the input terminals of the transducer, said bridge also having two power input terminals and two sets of opposed control input terminals;

a unidirectional power source connected to the two power input terminals of the bridge for driving the transducer in accordance with the conduction states of the transistors in the bridge; and means for controlling the conduction states of the transistors in the bridge, comprising:

a sine wave generator producing variable frequency sine wave signals including frequencies at least as low as ten cycles;

a square wave converter connected to said sine wave generator and having first and second outputs for converting a sine wave input thereto to one negative square wave at said first output thereof synchronized with the positive portions of said sine wave input and another negative square wave at said second output thereof synchronized with the negative portions of said sine wave input;

first and second transistors, each having a base, an emitter connected to a supply voltage source, and a collector output;

first and second means responsive to respective first and second negative signal outputs from said square wave converter to apply an output signal to each base of said first and second transistors;

third and fourth transistors each having a base which receives the input from said first transistor output, an emitter connected to a supply voltage source, and a collector output connected to respective ones of a set of said opposed control input terminals of the bridge for directing current from said power source to the transducer in one direction when said sine wave is positive; and fifth and sixth transistors each having a base which receives the input from said second transistor output, an emitter connected to a supply voltage source, and a collector output connected to respective ones of the other set of said opposed control input terminals of the bridge for directing current from said power source to the transducer in the opposite direction when said sine wave is negative.

(References on following page)

References Cited by the Examiner
UNITED STATES PATENTS

| | | | |
|---|---|---|---|
| 2,821,639 | 1/1958 | Bright et al. | 307—88.5 |
| 2,872,582 | 2/1959 | Norton | 307—88.5 |
| 2,972,710 | 2/1961 | D'Amico | 307—88.5 |
| 3,059,191 | 10/1962 | Hierholzer et al. | 307—88.5 |
| 3,074,030 | 1/1963 | Hierholzer | 307—88.5 |
| 3,078,379 | 2/1963 | Plogstedt et al. | 307—88.5 |
| 3,080,534 | 3/1963 | Paynter | 307—88.5 |

ARTHUR GAUSS, *Primary Examiner.*

JOHN W. HUCKERT, *Examiner.*

R. H. EPSTEIN, *Assistant Examiner.*